G. A. LYON.
AUTOMOBILE TIRE HOLDER.
APPLICATION FILED SEPT. 15, 1917.
1,386,185.
Patented Aug. 2, 1921.
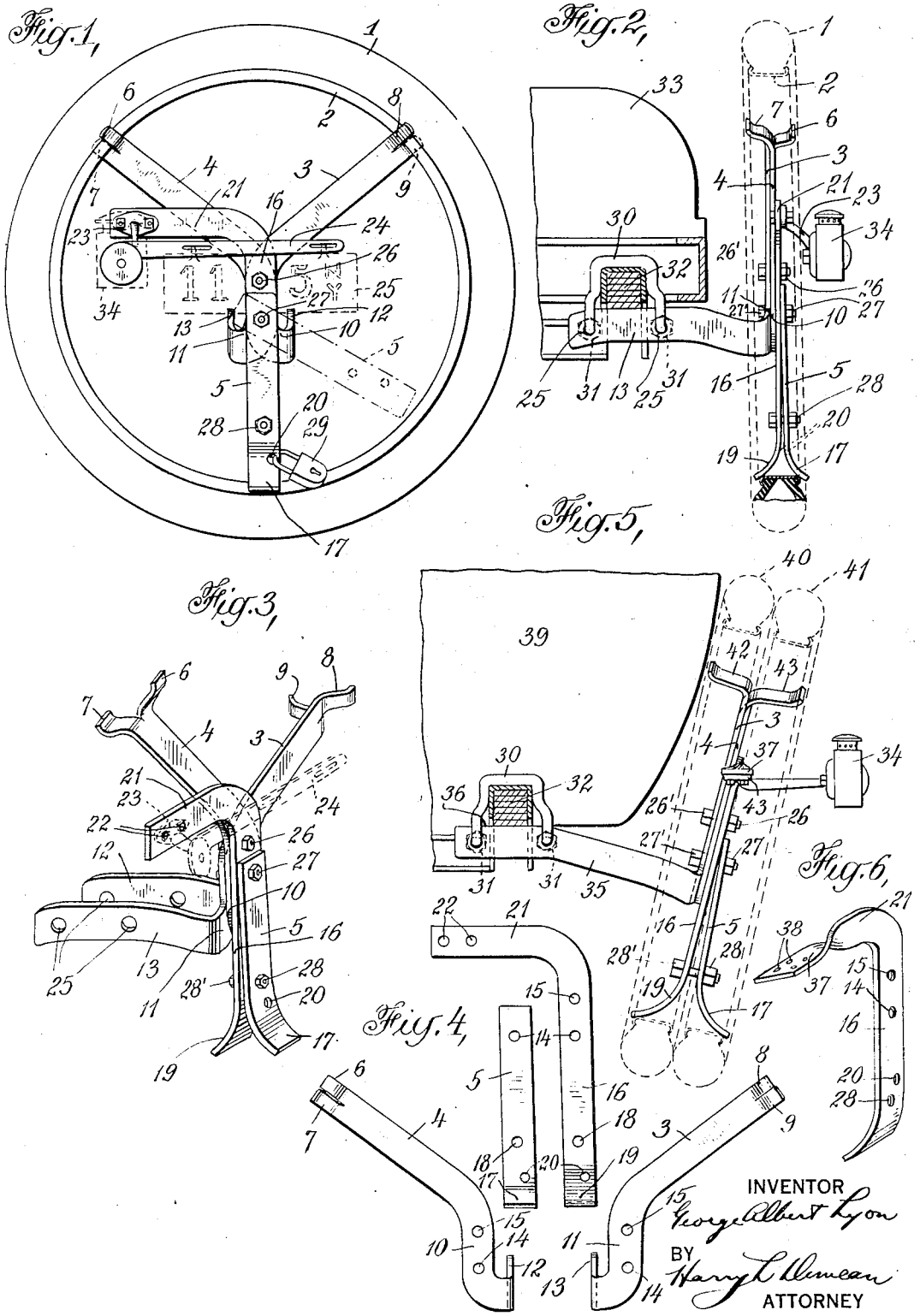
INVENTOR
George Albert Lyon
BY
Harry L. Duncan
ATTORNEY

UNITED STATES PATENT OFFICE.

GEORGE ALBERT LYON, OF PHILADELPHIA, PENNSYLVANIA.

AUTOMOBILE-TIRE HOLDER.

1,386,185.   Specification of Letters Patent.   Patented Aug. 2, 1921.

Application filed September 15, 1917. Serial No. 191,526.

*To all whom it may concern:*

Be it known that I, GEORGE ALBERT LYON, a citizen of the United States, and resident of Philadelphia, Philadelphia county, Pennsylvania, have made a certain new and useful Invention Relating to Automobile-Tire Holders, of which the following is a specification, taken in connection with the accompanying drawing, which forms part of the same.

This invention relates especially to tire holders adapted to be used with Ford or similar automobiles and which may be substantially composed of a plurality of flat metal strips having attaching arms or members adapted to be bolted or secured to the rear spring of a run-about automobile so that the tire holder can be mounted in substantially rigid position. The flat strips, preferably of spring steel or other resilient material, may be provided with overlapping junction portions located substantially centrally of the tire and connecting to or merging into upwardly extending divergent tire supporting arms which may have split oppositely bent ends or tires supporting fingers adapted to support one or more tires and the usual connected detachable rims and hold the same in proper alinement. A tire holding arm may, if desired, be bolted or otherwise secured to the junction portions to which a swinging or otherwise movable retainer arm may also be secured, these two depending arms being preferably formed with wedging clamping ends so as to engage the lower portions of the tire rims and force them downward when these two depending arms are brought together by a clamping bolt or means which thus bring one or more tires into engagement with the tire holder at all points of contact. If desired, the tire holding arm may have an upward extension which may project laterally to serve as a clamp supporting arm to which the lamp and license bracket may be secured.

In the accompanying drawings showing in a somewhat diagrammatic way illustrative embodiments of this invention, Figure 1 is a rear view showing one form of the tire holder when assembled but not secured to the vehicle.

Fig. 2 is a side sectional view of the same as secured to a Ford or similar run-about automobile.

Fig. 3 is a perspective view of the assembled but disconnected tire holder.

Fig. 4 is an elevation showing the parts of the tire holder in separated positions.

Fig. 5 is a side sectional view of another form of tire holder shown as attached to a Ford or similar touring car; and Fig. 6 is a perspective view showing one of the parts of this tire holder.

The tire holder may comprise a pair of flat resilient metal strips which are preferably though not necessarily of tempered spring steel. To secure the maximum strength and stiffness with minimum weight the strips are preferably of tempered steel and are made quite wide as compared to their transverse thickness, strips about an inch and a half or two inches wide and a quarter to three-eighths of an inch thick giving good results. These strips are preferably provided with integral attaching arms to be attached or clamped to the automobile and a simple and effective arrangement is to clamp beneath the rear spring of the machine the upper bearing faces of these strips which are preferably vertically arranged for greater stiffness. As shown in Figs. 1 and 2 the attaching arms 12, 13, may be formed with upper bearing faces adapted to be clamped directly underneath the rear spring 32 of the machine in any suitable way as by the clamping U-bolts 30 passing around the spring and its channeled frame member or bolster so as to securely hold the tire holder in desired position when the nuts 31 are screwed home. These forwardly extending attaching arms are preferably vertically arranged and may extend substantially perpendicular to the body of the tire holder or tires to be secured thereto in the case of a tire holder for a Ford run-about body 33, so that when the attaching arms are clamped against the rear spring the tire holder and tires are supported in substantially vertical position as shown in Fig. 2.

As indicated in Figs. 1, 2 and 3, the spring strips extending rearwardly from the points of attachment are preferably bent toward each other and upward into a plane substantially perpendicular to the adjacent parts of the attaching arms in this form of tire holder so as to form the flat junction portions or members 10, 11, where the strips may be held rigidly together by any suitable connecting means, such as the junction bolts 26, 27 extending through holes 14, 15 in the junction portions as in Fig. 4. It is desirable though not necessary in all cases that the two strips cross each other at the junction portions so that their upper extensions forming the upwardly diverging tire supporting arms 3, 4 are each located on the opposite side of the junction portion from the attaching arm thereon in this crossover or saw-horse type of the device. The upper ends of these tire supporting arms which may extend substantially radially from about the center of the tire 1 and rim 2 at an angle of about 120° apart, more or less, may be split and oppositely bent so as to form tire supporting fingers 6, 7, 8, 9, of such width as to hold one or more tires and the attached demountable rims on which they are mounted and at the same time exert a suitable lateral alining action so that the tires cannot shake or move transversely. Another similarly flat strip may form a depending tire holding arm 16 rigidly held or clamped against the junction portions of the other strips by the same junction bolts and nuts 26, 26' and 27, 27', and if desired a retainer arm 5 of preferably somewhat shorter length may be permanently connected therewith at its upper end as by one of these bolts 27, 27', while its lower end may be adjustably clamped to the tire holding arm as by a suitable clamping means or bolt and nut 28, 28'. The lower ends of these arms may be given a curved diverging form so as to form wedging clamping ends 17, 19 between which the tire rims are securely clamped and wedged downward when these depending arms are forced together, as is indicated in Fig. 2. This action not only tightly clamps the tire rim at its lower portion, but also forcibly draws it downward against the two upper points of support where it is in engagement with the tire supporting fingers so that a firm contact is secured at all three of these points and rattling and looseness prevented, which is further promoted by the resilient character of the wedging clamping ends and connected arms. If desired the lower ends of these depending arms may be formed with one or more lock holes, such as 20, through which a locking device or padlock 29 may extend so as to lock the tire in position and prevent theft thereof. When the tire is to be removed by the owner for use on one of the wheels this lock may be removed and the clamping nut 28 loosened and removed so that the retainer arm 5 may be swung laterally about its bolt 27 into some such position as is indicated by the dotted lines in Fig. 1 which releases the tire and rim and allows their ready removal without detaching any of the strips of which the tire holder is composed.

If desired, the tire holding arm 16 may as indicated in Fig. 3, have an upward extension beyond the junction portions of the device which may be bent upward and sidewise so as to form the lamp supporting arm 21 having one or more holes 22 through which bolts may pass for clamping thereto the usual lamp bracket 23 shown in dotted lines and which may also comprise the usual license bracket 24. The position of the lamp bracket can also be seen in full lines in Fig. 1 in which a license plate 25 is shown in dotted lines as coöperating therewith, the lamp 34 being also shown in dotted lines in this figure and in full lines in Fig. 2.

This tire holder also has the decided advantage of compactness for shipping, since its flat strips which are shown as disconnected and separated in Fig. 4 may be packed in relatively small compass which is one reason why the sawhorse or cross-over type of main arms is desirable. It is of course apparent that the device is so simple that the ordinary mechanic or auto owner can readily assemble the parts and bolt them together and attach them to an automobile without further information than the usual illustrated directions sent out with such devices.

Fig. 5 shows another form of tire holder adapted for use on Ford or similar touring cars in which the attaching arms 35 are made longer and are formed with bearing faces or portions 36 extending at a suitable angle therefrom, so that when clamped in position against the spring 32 the tire holder is mounted at a desirable angle at the rear of the touring body 39 and at the proper distance therefrom. In this instance the split oppositely bent tire supporting fingers 42, 43 which may be formed on the two tire supporting arms 3, 4 are shown of greater length so as to engage the rims of two automobile tires 40, 41. The wedging clamping ends 17, 19 of the tire holding arm and retainer arm are correspondingly wider apart so that when these depending arms are forced together by the clamping nut and bolt 28, 28' the tires and rims are forced downward and also into firm contact at their two upper points of support and at the same time the wedging or alining shape of the ends of these arms or fingers forces the rims together so that the attached inflated tires are resiliently brought together which still further minimizes looseness or rattling. Of course when one or both of the tires are deflated they may be forced further together so that the rims may come into substantial or actual contact. With this type of tire holder the lamp supporting arm 21 is preferably provided with a twisted end 37 having the bolt holes 38 so that its end may be substantially horizontal and properly coöperate with the different shaped lamp and license bracket 43 which may be arranged to project somewhat farther to the rear in this instance.

This invention has been described in connection with a number of illustrative forms, proportions, parts, materials, arrangements and sizes, to the details of which disclosure the invention is not of course to be limited, since what is claimed as new and what is desired to be secured by Letters Patent is set forth in the appended claims.

1. In tire holders adapted for use with Ford automobiles, a pair of flat strips of spring steel having considerably greater width than thickness and each having vertically rigid attaching arms and a junction member at substantially right angles thereto, and an upwardly extending tire supporting arm beyond said junction member and in substantially the plane thereof, split oppositely bent tire supporting fingers formed on the ends of each of said tire supporting arms and having angularly arranged ends to laterally aline a tire or rim, a depending tire holding arm having a junction portion to coöperate with the junction members of said strips and having a laterally extending upper lamp supporting arm, a depending retainer arm connected at its upper end to said junction members and adjustably clamped at a lower portion to said tire holding arm, angularly arranged wedging clamping ends formed on said tire holding arm and said retainer arm and adapted to engage a tire rim and hold the same in alinement and force the same downward and insure firm contact with said tire supporting fingers, said attaching arms having bearing faces and attaching holes adapted to coöperate with the rear spring of an automobile and coöperating attaching means adapted to clamp said tire holder in position.

2. In tire holders adapted for use with Ford automobiles, a pair of flat strips having considerably greater width than thickness and each having vertically rigid attaching arms and a junction member and an upwardly extending tire supporting arm beyond said junction member, tire supporting fingers formed on the ends of each of said tire supporting arms, a depending tire holding arm having a junction portion to coöperate with the junction members of said strips, a depending retainer arm connected at its upper end to said junction members and adjustably clamped at a lower portion to said tire holding arm, clamping ends formed on said tire holding arm and said retainer arm, and adapted to engage a tire rim and hold the same in alinement.

3. In tire holders adapted for use with Ford or similar automobiles, a pair of flat strip members having considerably greater width than thickness and each having a junction portion and an upwardly extending diverging tire supporting arm, split oppositely bent tire supporting fingers formed on the ends of each of said tire supporting arms and having angularly arranged ends adapted to laterally aline a tire rim, a depending tire holding arm having a junction portion to coöperate with the junction portions of said members, a laterally extending lamp supporting arm, a depending retainer arm movably secured at its upper end to said tire holding arm, means to adjustably and resiliently force the lower end of said retainer arm toward said tire holding arm and angularly arranged wedging clamping ends formed on said tire holding arm and said retainer arm and adapted to engage a tire rim and hold the same in alinement and resiliently force the same downward and insure firm contact with said tire supporting fingers.

4. In tire holders adapted for use with Ford or similar automobiles, a pair of members each having a junction portion and an upwardly extending diverging tire supporting arm, split oppositely bent tire supporting fingers formed on the ends of each of said tire supporting arms, a depending tire holding arm having a junction portion to coöperate with the junction portions of said members, a depending retainer arm movably secured at its upper end to said tire holding arm, means to adjustably and resiliently force the lower end of said retainer arm toward said tire holding arm, and angularly arranged wedging clamping ends formed on said tire holding arm and said retainer arm and adapted to engage a tire rim and hold the same in alinement and resiliently force the same downward and insure firm contact with said tire supporting fingers.

5. In tire holders adapted for use with Ford or similar automobiles, a pair of members each having a junction portion and an upwardly extending diverging tire supporting arm, tire supporting members formed on said tire supporting arms, a depending tire holding arm having a junction portion to coöperate with the junction portions of said members, a retainer movably secured to said tire holding arm, means to adjustably and resiliently force the lower end of said retainer toward said tire holding arm, and clamping ends formed on said tire holding arm and said retainer and adapted to engage a tire rim and hold the same in alinement and resiliently force the same downward and insure firm contact with said tire supporting members.

6. In knock-down tire holders adapted for use with Ford or similar automobiles, a pair of flat strip members, each having a junction portion and an upwardly extending diverging tire supporting arm, tire supporting members formed on said tire supporting arms, a depending tire holding arm having a junction portion to coöperate with the junction portions of said members, a depending retainer arm movably secured to said tire holding arm, means to adjustably and resiliently force the lower end of said retainer arm toward said tire holding arm, clamping ends formed on said tire holding arm and said retainer arm and adapted to engage a tire rim and hold the same in alinement and resiliently force the same downward and insure firm contact with said tire supporting members and means to disengageably connect said junction portions.

7. In knock-down tire holders adapted for use with Ford or similar automobiles, a pair of resilient flat strip members each having vertically rigid attaching arms adapted to be secured to the automobile and a junction portion at an angle thereto, and an upwardly extending diverging tire supporting arm beyond said junction portion and on the side opposite to the connected attaching arm, split oppositely bent tire supporting fingers formed from the ends of each of said tire supporting arms, a depending tire holding arm having a junction portion to coöperate with the junction portions of said members and having a laterally extending lamp supporting arm, means coöperating with said tire holding arm and adapted to laterally engage a tire rim and hold the same in alinement and resiliently force the same downward and insure its firm contact with said tire supporting fingers, and junction bolts extending through holes in said junction portions to removably hold said junction portions together.

8. In knock-down tire holders adapted for use with Ford or similar automobiles, a pair of strip members each having vertically rigid attaching arms adapted to be secured to the automobile and a junction portion at an angle thereto, and an upwardly extending tire supporting arm, split oppositely bent tire supporting fingers formed from the ends of each of said tire supporting arms, a depending tire holding arm having a junction to coöperate with the junction portions of said members, means coöperating with said tire holding arm and adapted to engage a tire rim and hold the same in alinement and resiliently force the same downward and insure its firm contact with said tire supporting fingers, and means extending through holes in said junction portions to removably hold said junction portions together.

9. In tire holders adapted for use with Ford or similar automobiles, a pair of substantially vertically rigid members each having a junction portion and an upwardly extending diverging tire supporting arm, a depending tire holding arm having a junction portion adapted to be connected to the junction portions of said members, a depending retainer arm movably secured to said tire holding arm, means to adjustably and resiliently force the lower end of said retainer arm toward said tire holding arm to engage a tire rim and hold the same in alinement and resiliently force the same downward and insure firm contact with said tire supporting arms.

10. In demountable rim tire holders adapted for use with Ford or similar automobiles, a pair of members formed of steel strip having many times greater width than thickness and having integral rearwardly extending attaching members and upwardly extending tire and rim supporting members arranged to be substantially rigid in a vertical plane, and adapted to be held together in overlapping relation to each other, and downwardly extending spring pressure holding means for applying coöperative wedging radial pressure against the tire and rim and said supporting members.

11. In demountable rim tire holders adapted for use with Ford or similar automobiles, a pair of members formed of steel strip having integral rearwardly extending attaching members and upwardly extending tire and rim supporting members arranged to be substantially rigid in a vertical plane and adapted to be held together, and downwardly extending spring pressure holding means for applying coöperative wedging radial pressure against the tire and rim and said supporting members.

12. In demountable rim tire holders adapted for use with Ford or similar automobiles, a pair of members formed of steel having rearwardly extending attaching members and upwardly extending tire and rim supporting members arranged to be substantially rigid in a vertical plane and adapted to be held together, and downwardly extending holding means for applying coöperative wedging radial pressure against the tire and rim and said supporting members.

GEORGE ALBERT LYON.